(12) United States Patent
Shin

(10) Patent No.: US 11,591,008 B2
(45) Date of Patent: Feb. 28, 2023

(54) STEERING DEVICE OF VEHICLE

(71) Applicant: HL MANDO CORPORATION, Pyeongtaek (KR)

(72) Inventor: Woong Soo Shin, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/722,395

(22) Filed: Apr. 18, 2022

(65) Prior Publication Data

US 2022/0340194 A1     Oct. 27, 2022

(30) Foreign Application Priority Data

Apr. 26, 2021 (KR) .......................... 10-2021-0053572

(51) Int. Cl.
*B62D 3/08* (2006.01)

(52) U.S. Cl.
CPC ..................................... *B62D 3/08* (2013.01)

(58) Field of Classification Search
CPC ..... F16H 25/2214; B62D 5/0448; B62D 3/06; B62D 3/08
See application file for complete search history.

(56) References Cited

U.S. PATENT DOCUMENTS

| | | | | |
|---|---|---|---|---|
| 1,193,133 | A * | 8/1916 | Flora | B62D 3/06 74/606 R |
| 3,218,937 | A * | 11/1965 | Dettlof | B62D 5/24 92/33 |
| 3,665,783 | A * | 5/1972 | Arnold | B62D 3/06 74/498 |
| 8,935,967 | B2 * | 1/2015 | Chen | F16H 25/2214 74/424.83 |
| 9,400,041 | B2 * | 7/2016 | Kuo | F16H 25/2228 |
| 9,446,787 | B2 * | 9/2016 | Asakura | F16H 25/2223 |
| 9,546,717 | B2 * | 1/2017 | Kuster | F16H 25/2214 |
| 9,657,820 | B1 * | 5/2017 | Hsieh | F16H 25/2214 |
| 10,663,042 | B2 * | 5/2020 | Sun | F16H 25/2219 |
| 10,871,211 | B2 * | 12/2020 | Kuster | F16C 33/581 |
| 11,320,028 | B2 * | 5/2022 | Kubota | F16H 25/2214 |
| 11,402,002 | B2 * | 8/2022 | Iinuma | F16H 25/2214 |
| 2010/0107794 | A1 * | 5/2010 | Lin | F16H 25/2214 74/424.83 |
| 2010/0139433 | A1 * | 6/2010 | Chen | F16H 25/2214 74/424.87 |
| 2010/0170359 | A1 * | 7/2010 | Chen | F16H 25/2214 74/424.86 |
| 2012/0000306 | A1 * | 1/2012 | Chen | F16H 25/2214 74/424.86 |

(Continued)

FOREIGN PATENT DOCUMENTS

CN        201116592 Y  *  9/2008  ......... F16H 25/2214
DE    102013219987 A1 *  4/2015  .......... B62D 5/0448

(Continued)

*Primary Examiner* — Amy R Weisberg
*Assistant Examiner* — Maxwell L Meshaka
(74) *Attorney, Agent, or Firm* — Harvest IP Law LLP

(57) ABSTRACT

According to the present embodiments, it is easy to be drawn in or out balls between the sliding bar and the ball nut. Thus, it is possible to easily replace the balls. Therefore, it is possible to easily compensate for the gap between the sliding bar and the ball nut.

14 Claims, 7 Drawing Sheets

(56) References Cited

U.S. PATENT DOCUMENTS

| | | | | |
|---|---|---|---|---|
| 2013/0199324 A1* | 8/2013 | Piltz | ................... | F16H 25/2223 |
| | | | | 74/424.86 |
| 2014/0174232 A1* | 6/2014 | Chen | ................... | F16H 25/2223 |
| | | | | 74/424.87 |
| 2015/0152946 A1* | 6/2015 | Piltz | ................... | F16H 25/2214 |
| | | | | 74/424.87 |
| 2015/0362050 A1* | 12/2015 | Kuo | ................... | F16H 25/2228 |
| | | | | 74/424.85 |
| 2016/0076632 A1* | 3/2016 | Kuster | ............... | F16H 25/2214 |
| | | | | 74/424.87 |
| 2018/0281843 A1* | 10/2018 | Asakura | .................. | F16H 7/023 |
| 2018/0328472 A1* | 11/2018 | Kuster | ............... | F16H 25/2204 |
| 2020/0003286 A1* | 1/2020 | Sun | .................... | F16H 25/2219 |
| 2021/0190186 A1* | 6/2021 | Kubota | ............... | F16H 25/2214 |
| 2022/0097752 A1* | 3/2022 | Enomoto | ................. | B62D 3/08 |

FOREIGN PATENT DOCUMENTS

| | | | | |
|---|---|---|---|---|
| EP | 2514997 A1 | * | 10/2012 | ......... F16H 25/2214 |
| JP | 6514797 B1 | * | 5/2019 | ......... F16H 25/2214 |
| JP | 6546713 B1 | * | 7/2019 | ............... B62D 3/08 |
| WO | WO-2014184154 A1 | * | 11/2014 | ........ F16H 25/2214 |
| WO | WO-2019130385 A1 | * | 7/2019 | ......... F16H 25/2214 |
| WO | WO-2020202269 A1 | * | 10/2020 | ............... B62D 3/08 |

* cited by examiner

STEERING DEVICE OF VEHICLE

CROSS-REFERENCE TO RELATED APPLICATION

This application claims priority from Korean Patent Application No. 10-2021-0053572, filed on Apr. 26, 2021, which is hereby incorporated by reference for all purposes as if fully set forth herein.

BACKGROUND

Field

The present embodiments relates to a steering device of a vehicle and, more specifically, a steering device of a vehicle, in which it is easy to be drawn in or out balls between the sliding bar and the ball nut, and it is thus possible to easily replace the balls, thereby rendering it possible to easily compensate for the gap between the sliding bar and the ball nut.

Description of Related Art

The rack-driven power assist steering system or steer-by-wire steering system includes a sliding bar having two opposite ends connected with a tie rod and a knuckle arm, a ball nut coupled with the sliding bar via balls, and a motor for rotating the ball nut to assist the driver in steering or steer the vehicle based on the driver's steering wheel manipulation information.

In such a steering device, the motor rotates the ball nut through the belt, and the rotation of the ball nut turns into linear movement of the sliding bar engaged with the ball nut. In other words, a screw groove is formed in each of the inner circumferential surface of the ball nut and the outer circumferential surface of the sliding bar, and balls are inserted in each screw groove so that when the ball nut is rotated, the sliding bar is slid by the balls and the screw groove.

As a structure for allowing the balls to steadily circulate without departing between the ball nut and the sliding bar, a deflector may be used. As the balls are provided with a mid-path connecting two opposite ends of the screw groove by a deflector coupled to the ball nut, the balls are circulated.

Conventionally, by the structure of the ball nut and the sliding bar, balls are drawn in from an end of the battery to a space between the ball nut and the sliding bar, and this approach renders it burdensome to drawn in and out the balls. In other words, a gap may be caused between the ball nut or sliding bar and the balls due to, e.g., an error caused by processing difficulty of the screw groove, and such a gap may lead to noise or poor response. Thus, the gap is removed by drawing in and out tiny balls between the ball nut and the sliding bar. In other words, according to the prior art, drawing in and out the balls is quite bothering, and gap removal is complicated and takes long.

BRIEF SUMMARY

The present embodiments have been conceived in the foregoing background and relates to a steering device of a vehicle, in which it is easy to be drawn in or out balls between the sliding bar and the ball nut, and it is thus possible to easily replace the balls, thereby rendering it possible to easily compensate for the gap between the sliding bar and the ball nut.

According to the present embodiments, there may be provided a steering device of a vehicle, comprising a sliding bar, a ball nut coupled with the sliding bar via balls and having a coupling hole formed through an inner circumferential surface and outer circumferential surface thereof, and a deflector including a base member inserted to the coupling hole, forming a circulation path of the balls between the sliding bar and the ball nut, and having a communication hole communicating with the circulation path and a cover member covering the communication hole and coupled with the base member.

According to the present embodiments, it is easy to be drawn in or out balls between the sliding bar and the ball nut. Thus, it is possible to easily replace the balls. Therefore, it is possible to easily compensate for the gap between the sliding bar and the ball nut.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
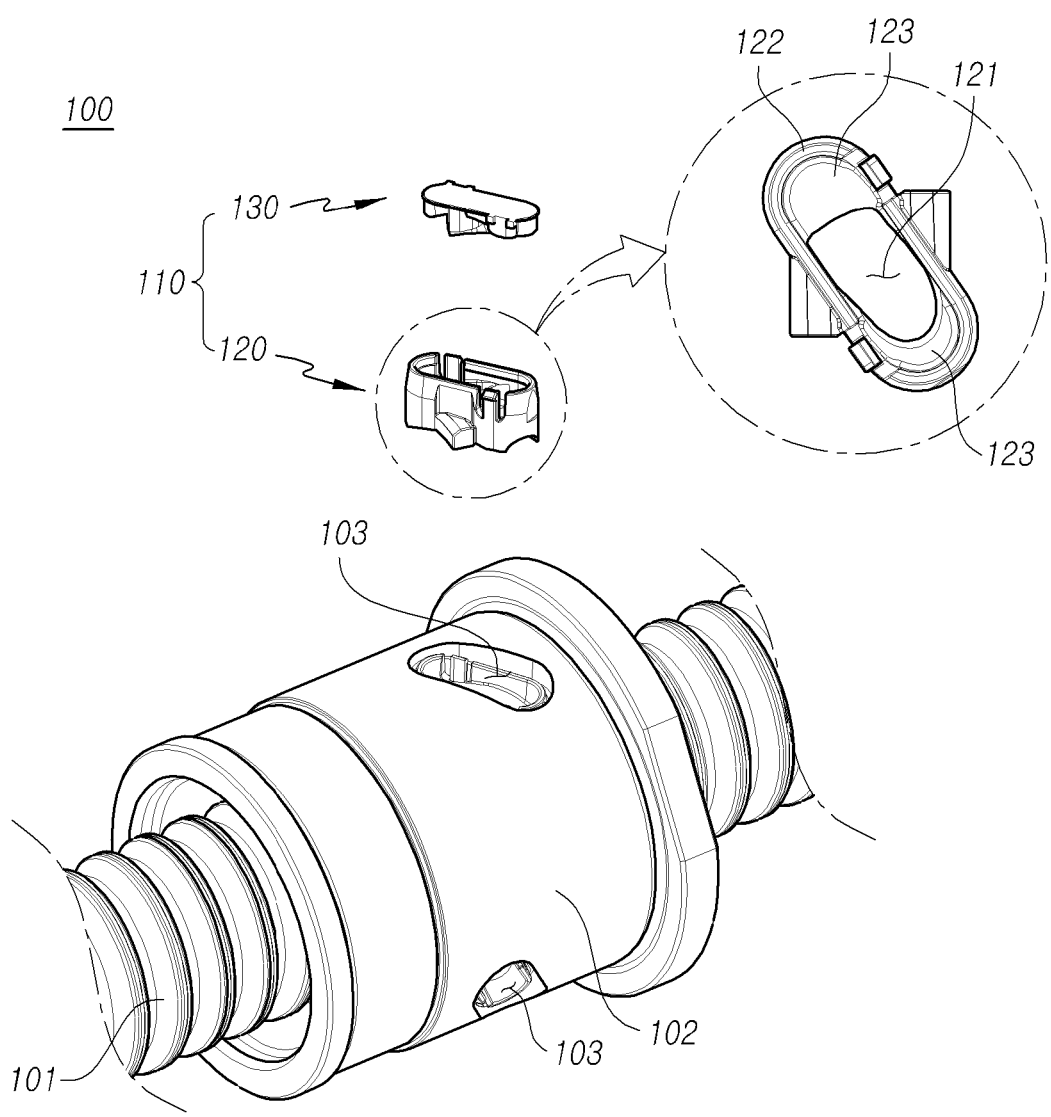
FIG. 1 is an exploded perspective view illustrating a steering column for a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
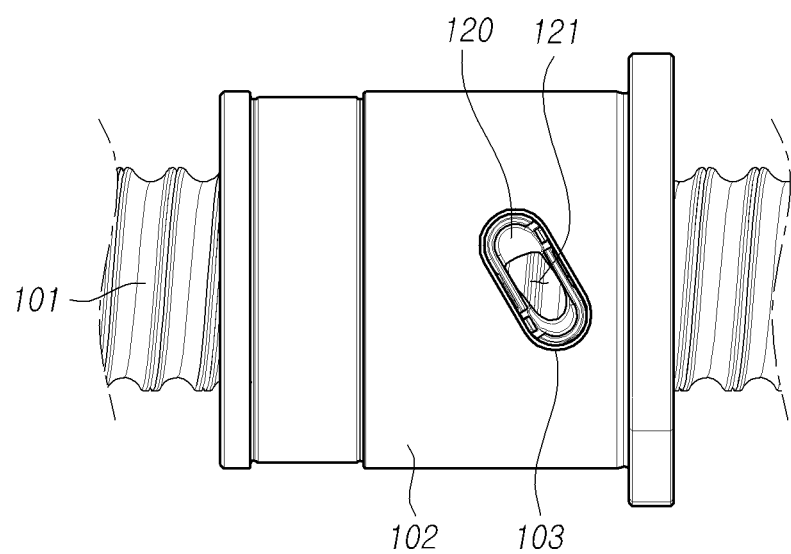
FIG. 2 is a perspective view illustrating an assembled state of FIG. 1.
Figure 3:
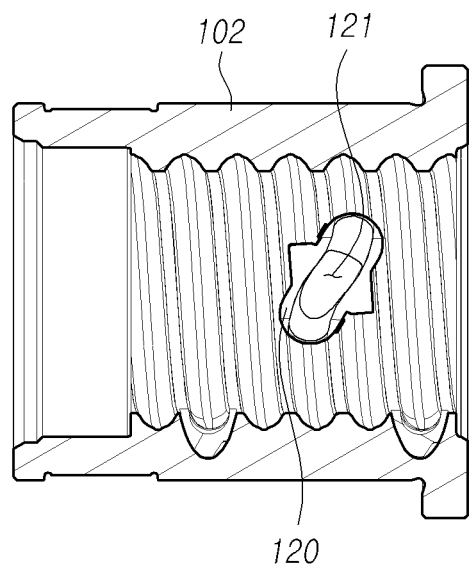
FIG. 3 is a cross-sectional view illustrating a portion of FIG. 2.
Figure 4:
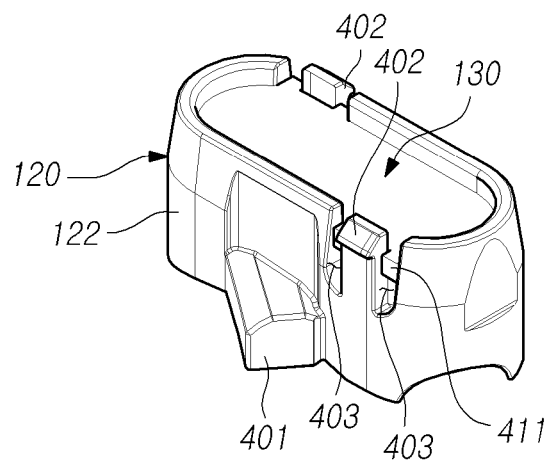
FIG. 4 is a perspective view illustrating a portion of FIG. 2.
Figure 5:
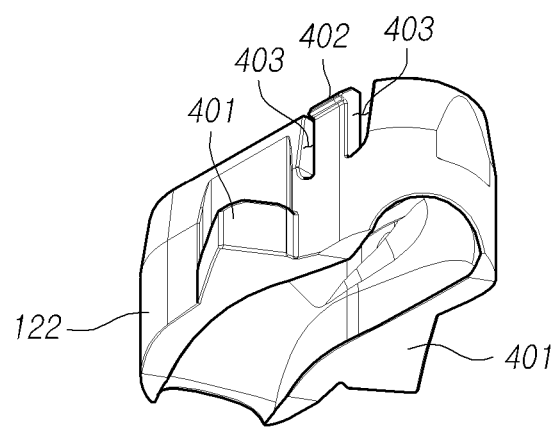
FIG. 5 is a cross-sectional view of FIG. 4.
Figure 6:
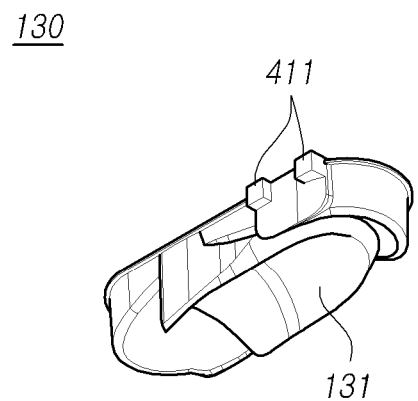
FIGS. 6 and 7 are perspective views illustrating a portion of FIG. 1.
Figure 7:
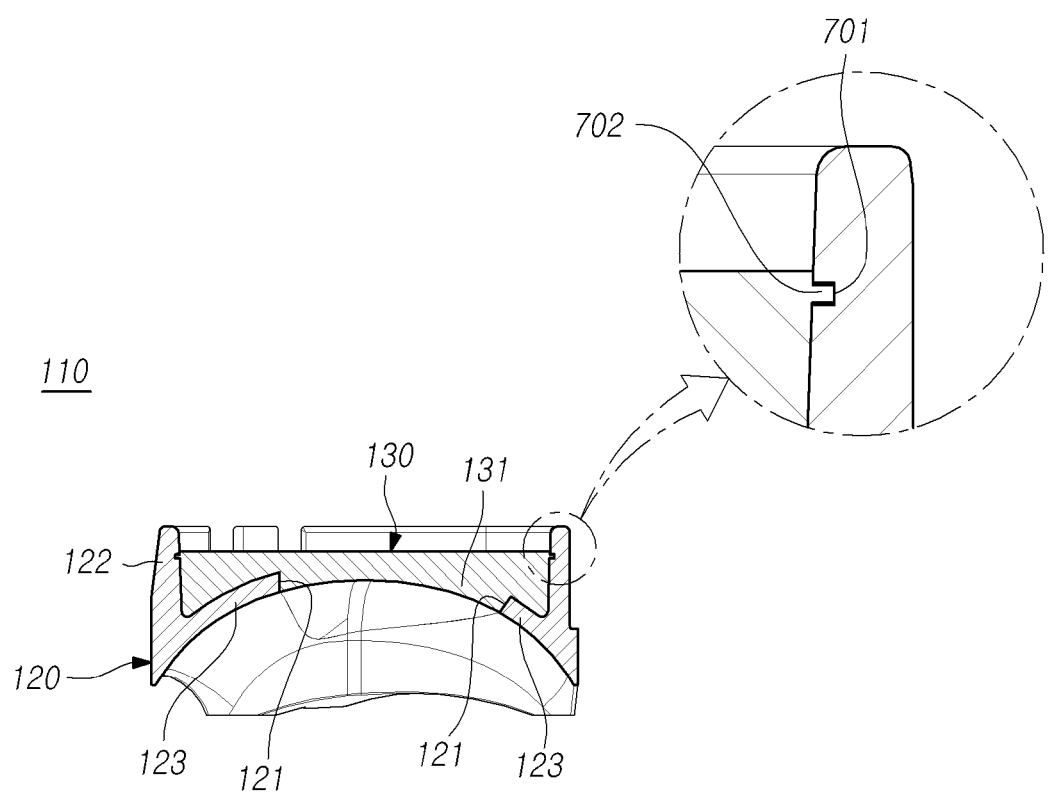

FIG. 1 is an exploded perspective view illustrating a steering column for a vehicle according to the present embodiments. FIG. 2 is a perspective view illustrating an assembled state of FIG. 1. FIG. 3 is a cross-sectional view illustrating a portion of FIG. 2. FIG. 4 is a perspective view illustrating a portion of FIG. 2. FIG. 5 is a cross-sectional view of FIG. 4. FIGS. 6 and 7 are perspective views illustrating a portion of FIG. 1.

Referring to FIG. 1, a steering device 100 of a vehicle according to the present embodiments includes a sliding bar 101, a ball nut 102 coupled with the sliding bar 101 via balls and having a coupling hole 103 formed through an inner circumferential surface and outer circumferential surface thereof, and a deflector 110 including a base member 120 inserted to the coupling hole 103, forming a circulation path of the balls between the sliding bar 101 and the ball nut 102, and having a communication hole 121 communicating with the circulation path and a cover member 130 covering the communication hole 121 and coupled with the base member 120.

Tie rods and knuckle arms are connected to two opposite ends of the sliding bar 101, and as the sliding bar 101 slides lengthwise, the wheels are steered. The sliding bar 101 is slid by rotation of the ball nut 102.

The sliding bar 101 may be a sliding bar formed with a rack gear engaged with the pinion gear of the steering shaft or may lack a mechanical connecting structure with the steering shaft. The ball nut 102 receives power from the motor by a belt, nut pulley, and motor pulley. Such structure is a known structure, and a detailed description and illustration is omitted.

A screw groove is formed in each of the outer circumferential surface of the sliding bar 101 and the inner circumferential surface of the ball nut 102, and the sliding bar and the ball nut 102 are coupled via balls fitted into the screw grooves. In other words, as the balls move along the screw grooves between the sliding bar 101 and the ball nut 102, the rotation of the ball nut 102 turns into linear movement of the sliding bar 101.

The deflector 110 including the base member 120 and the cover member 130 are provided to the ball nut 102, so that when the ball nut 102 is rotated, and the sliding bar 101 is slid, the balls may continue to circulate between the ball nut 102 and the sliding bar 101 without escaping off. Further, due to the structure of the deflector 110, the balls may easily be drawn in and out between the sliding bar 101 and the ball nut 102.

Referring to FIGS. 2 and 3, the coupling hole 103 is formed through the inner circumferential surface and outer circumferential surface of the ball nut 102. The base member 120 of the deflector 110 is inserted to the coupling hole 103 and is coupled to the ball nut 102.

Referring to FIGS. 4 to 7, the structure of the base member 120 and the cover member 130 are described.

The base member 120 includes a supporting wall 122 fitted into the coupling hole 103 and having an outer wall surface supported on the ball nut 102. The communication hole 121 communicating with the insertion path of the balls, described below, is positioned inside of the supporting wall 122.

To allow the base member 120 to be coupled with the ball nut 102, a first supporting protrusion 401 supported on the inner circumferential surface of the ball nut 102 and a second supporting protrusion 402 supported on the outer circumferential surface of the ball nut 102 may be provided on the outer wall surface of the supporting wall 122.

The first supporting protrusion 401 and the second supporting protrusion 402 each are formed to protrude from the outer wall surface of the supporting wall 122. Two or more first supporting protrusions 401 and two or more second supporting protrusions 402 may be provided.

A pair of cutouts 403 adjacent to each other may be formed through the outer wall surface and inner wall surface of the supporting wall 122, and the second supporting protrusion 402 may be provided between the cutouts 403. In other words, the cutouts 403 are formed to be open upward so that the second supporting protrusion 402 may be provided on the outer wall surface of the elastic piece formed between the cutouts 403.

In other words, the base member 120 may be inserted to the coupling hole 103 inside the ball nut 102 and be coupled to the ball nut 102. As the base member 120 is inserted to the coupling hole 103, the first supporting protrusion 401 is supported on the inner circumferential surface of the ball nut 102. As the elastic piece formed by the cutouts 403 is elastically deformed, and the second supporting protrusion 402 is supported on the outer circumferential surface of the ball nut 102, the base member 120 is coupled to the ball nut 102.

The cover member 130 may be coupled with the base member 120 coupled to the ball nut 102, from outside of the ball nut 102.

The base member 120 may be provided with a support 123 extending from the inner wall surface of the supporting wall 122 and forming the communication hole 121 (refer to FIG. 1). A pair of supports 123, facing each other may be formed to extend from the inner wall surface of the supporting wall 122 and form the communication hole 121 in the center. The cover member 130 covers the communication hole 121, from inside of the supporting wall 122. The cover member 130 may be supported on the support 123 and cover the communication hole 121.

A protrusion 131 inserted to the communication hole 121 may be formed on the inner surface, facing the sliding bar 101, of the cover member 130. A portion of the inner surface of the cover member 130 may be supported on the support 123, and another portion thereof, as the protrusion 131, may be inserted to the communication hole 121.

In the inner surface, facing the sliding bar 101, of the base member 120 is formed a groove communicating with the screw groove and forming a circulation path of the balls. The protrusion 131 is provided not to protrude beyond the inner surface of the base member 120, and is thus avoided from interference with the balls.

To be coupled with the base member 120, the cover member 130 has a coupling protrusion 702 and insertion protrusions 411.

The insertion protrusions 411 protrude from the circumferential surface of the cover member 130 and are inserted into the cutouts 403. The insertion protrusion 411 is formed in the position corresponding to each cutout 403 and, as the insertion protrusions 411 are fitted into the cutouts 403, the cover member 130 and the base member 120 are guided for coupling.

A coupling recess 701 is depressed in the inner wall surface of the supporting wall 122, and the coupling protrusion 702 protrudes from the cover member 130 to be inserted into the coupling recess 701. The cover member 130 guided by the insertion protrusions 411 and the cutouts 403 is coupled with the base member 120 as the coupling protrusion 702 is inserted into the coupling recess 701.

The coupling recess 701 may be formed along the circumference of the inner wall surface of the supporting wall 122, and the coupling protrusion 702 may be formed along the circumference of the cover member 130.

A description is made below with reference to FIGS. 2 and 3.

The coupling hole 103 may be formed over two adjacent screw grooves, and the base member 120 connects the screw groove exposed through the coupling hole 103, thereby forming a circulation path of the balls.

In other words, a groove connected with the screw groove is depressed in the inner surface, facing the sliding bar 101, of the base member 120. The balls circulate along the groove formed in the inner surface of the base member 120 and a portion of the screw groove. When the ball nut 102 rotates so that the sliding bar 101 is slid, the balls are continuously circulated along the circulation path without departing off between the ball nut 102 and the sliding bar 101.

Further, the communication hole 121 formed in the base member 120 is provided to communicate with the circulation path of the balls, and the balls may be drawn in or out of the circulation path through the communication hole 121.

In other words, unlike in the conventional art in which balls are drawn in or out through an end of the ball nut between the ball nut and the sliding bar, according to the present embodiments, the balls may easily be drawn in or out of the circulation path formed between the ball nut 102 and the sliding bar 101, through the communication hole 121.

Accordingly, it is possible to simplify the process of drawing in or out balls in different sizes between the ball nut 102 and the sliding bar 101. Thus, it is possible to easily remove the gap between the sliding bar 101s and the balls and the gap between the ball nut 102 and the balls by inserting balls in different sizes.

After the gap is removed, the cover member 130 is coupled to the base member 120, covering the communication hole 121.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering device of a vehicle, comprising:
   a sliding bar;
   a ball nut coupled with the sliding bar via balls and having a coupling hole formed through an inner circumferential surface and outer circumferential surface of the ball nut; and
   a deflector including a base member and a cover member, wherein the base member is inserted to the coupling hole, forms a circulation path of the balls between the sliding bar and the ball nut, and has a communication hole communicating with the circulation path; and
   cover member covers the communication hole, and is coupled with the base member, wherein a protrusion formed on an inner surface of the cover member is inserted into the communication hoe.

2. The steering device of claim 1, wherein the base member includes a supporting wall fitted into the coupling hole and having an outer wall surface supported on the ball nut, and wherein the communication hole is positioned inside the supporting wall.

3. The steering device of claim 2, wherein at least one first supporting protrusion supported on an inner circumferential surface of the ball nut is provided on the outer wall surface of the supporting wall.

4. The steering device of claim 3, wherein the at least one first supporting protrusion includes two or more first supporting protrusions.

5. The steering device of claim 2, wherein at least one second supporting protrusion supported on an outer circumferential surface of the ball nut is provided on the outer wall surface of the supporting wall.

6. The steering device of claim 5, wherein the at least one second supporting protrusion includes two or more second supporting protrusions.

7. The steering device of claim 5, wherein a pair of cutouts adjacent to each other are formed in the outer wall surface and inner wall surface of the supporting wall, and wherein the second supporting protrusion is provided between the cutouts.

8. The steering device of claim 7, wherein the cover member has insertion protrusions inserted into the cutouts.

9. The steering device of claim 2, wherein the base member includes a support extending from an inner wall surface of the supporting wall and forming the communication hole.

10. The steering device of claim 9, wherein the cover member is supported on the support.

11. The steering device of claim 2, wherein the cover member is supported on an inner wall surface of the supporting wall and covering the communication hole.

12. The steering device of claim 11, wherein a coupling recess is depressed in the inner wall surface of the supporting wall, and wherein the cover member has a coupling protrusion formed to protrude to be inserted into the coupling recess.

13. The steering device of claim 12, wherein the coupling recess is formed along a circumference of the inner wall surface of the supporting wall, and wherein the coupling protrusion is formed along a circumference of the cover member.

14. The steering device of claim 1, wherein the protrusion does not protrude beyond an inner surface of the base member.

* * * * *